US009766627B2

(12) United States Patent
Jägenstedt et al.

(10) Patent No.: US 9,766,627 B2
(45) Date of Patent: Sep. 19, 2017

(54) DISPLACEMENT SENSOR FOR A ROBOTIC VEHICLE DETECTING A LIFT EVENT AND A COLLISION EVENT

(71) Applicant: Husqvarna AB, Huskvarna (SE)

(72) Inventors: Patrik Jägenstedt, Tenhult (SE); Magnus Öhrlund, Malmbäck (SE); Mats Svensson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 6 days.

(21) Appl. No.: 14/412,484

(22) PCT Filed: Jun. 27, 2013

(86) PCT No.: PCT/SE2013/050797
§ 371 (c)(1),
(2) Date: Jan. 2, 2015

(87) PCT Pub. No.: WO2014/007728
PCT Pub. Date: Jan. 9, 2014

(65) Prior Publication Data

US 2015/0185733 A1 Jul. 2, 2015

Related U.S. Application Data

(60) Provisional application No. 61/668,136, filed on Jul. 5, 2012.

(51) Int. Cl.
*G01C 22/00* (2006.01)
*G05D 1/00* (2006.01)
(Continued)

(52) U.S. Cl.
CPC ........... *G05D 1/021* (2013.01); *A01D 34/008* (2013.01); *B60L 1/003* (2013.01); *B60L 3/0061* (2013.01);
(Continued)

(58) Field of Classification Search
CPC ............... A47L 2201/00; A47L 9/2857; A47L 2201/04; A47L 9/009; G05G 9/047; A01D 34/008; A01D 75/20; G05D 1/021
(Continued)

(56) References Cited

U.S. PATENT DOCUMENTS 4,455,460 A * 6/1984 Bunnell ............ G05G 9/04788 200/6 A
5,689,285 A * 11/1997 Asher .................... G05G 9/047 200/6 R
(Continued)

FOREIGN PATENT DOCUMENTS

CN 101091428 A 12/2007
CN 201127182 Y 10/2008
(Continued)

OTHER PUBLICATIONS

International Search Report and Written Opinion of PCT/SE2013/050797 mailed Oct. 12, 2013, all enclosed pages cited.
(Continued)

*Primary Examiner* — Isaac Smith
(74) *Attorney, Agent, or Firm* — McNair Law Firm, P.A.

(57) ABSTRACT

A robotic vehicle may include control circuitry configured to execute stored instructions to direct operation of the robotic vehicle on a defined area, and an electrical resistance sensor in communication with the control circuitry. The electrical resistance sensor may be configured to detect motion indicative of a lift event and a collision event using a single sensor.

19 Claims, 4 Drawing Sheets

(51) Int. Cl.

| | |
|---|---|
| ***G05D 1/02*** | (2006.01) |
| ***A01D 34/00*** | (2006.01) |
| ***B60L 1/00*** | (2006.01) |
| ***B60L 3/00*** | (2006.01) |
| ***B60L 8/00*** | (2006.01) |
| ***B60L 11/18*** | (2006.01) |
| ***B60L 15/20*** | (2006.01) |
| ***G01L 1/22*** | (2006.01) |
| ***G01L 5/00*** | (2006.01) |
| *A01D 75/20* | (2006.01) |

(52) U.S. Cl.

CPC ........... *B60L 8/003* (2013.01); *B60L 11/1805* (2013.01); *B60L 11/1818* (2013.01); *B60L 11/1877* (2013.01); *B60L 15/20* (2013.01); *G01L 1/2206* (2013.01); *G01L 5/0052* (2013.01); *G05D 1/0227* (2013.01); *A01D 75/20* (2013.01); *B60L 2200/40* (2013.01); *B60L 2240/36* (2013.01); *B60L 2240/421* (2013.01); *B60L 2260/32* (2013.01); *G05D 2201/0208* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/72* (2013.01); *Y02T 10/7275* (2013.01); *Y02T 90/14* (2013.01); *Y02T 90/16* (2013.01)

(58) Field of Classification Search

USPC ............... 701/25; 15/339; 345/161; 340/435

See application file for complete search history.

(56) References Cited

U.S. PATENT DOCUMENTS

| | | | | |
|---|---|---|---|---|
| 6,628,266 | B1 * | 9/2003 | Aguilar .................. | G05G 9/047<br>200/6 R |
| 7,603,744 | B2 * | 10/2009 | Reindle ................ | G05D 1/0227<br>15/319 |
| 2006/0220606 | A1 | 10/2006 | Jeon | |
| 2008/0300720 | A1 * | 12/2008 | Kim ........................ | A47L 9/009<br>700/245 |
| 2009/0308040 | A1 | 12/2009 | Cheek et al. | |

FOREIGN PATENT DOCUMENTS

| | | | | |
|---|---|---|---|---|
| CN | 201248261 | Y | 6/2009 | |
| EP | 2425700 | A2 | 3/2012 | |
| GB | 2404140 | A | 1/2005 | |
| SE | WO 03103375 | A1 * | 12/2003 | ........... A01D 34/008 |
| WO | 0170541 | A1 | 9/2001 | |
| WO | 0239868 | A1 | 5/2002 | |
| WO | 03103375 | A1 | 12/2003 | |
| WO | 2013125995 | A1 | 8/2013 | |

OTHER PUBLICATIONS

Chapter I International Preliminary Report on Patentability of PCT/SE2013/050797 mailed Jan. 6, 2015, all enclosed pages cited.

* cited by examiner

DISPLACEMENT SENSOR FOR A ROBOTIC VEHICLE DETECTING A LIFT EVENT AND A COLLISION EVENT

TECHNICAL FIELD

Example embodiments generally relate to robotic vehicles and, more particularly, relate to a robotic vehicle that includes a single sensor for detecting at least lift events and collision events.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Lawn mowers are typically capable of transiting over even and uneven terrain to execute yard maintenance activities relating to mowing. However, most lawn mowers are repeatedly exposed to the same operating environments over the course of their lifetimes. For example, a lawn mower may operate to cut a single yard over its entire life, or may operate to cut a relatively fixed series of yards or parcels if it is used for commercial purposes. Given that computing devices are becoming more ubiquitous, it is to be expected that they may be employed to assist in operation of lawn mowers. As such, many additional functionalities may be provided or supported by the employment of computing devices on lawn mowers.

Robotic mowers or self propelled mowers are one example of devices that employ an onboard computing device to enable their function. Moreover, such mowers are capable of autonomous or self-guided operation under the control of such a computing device. To control its operation, a robotic mower may employ a plurality of sensors to detect various events such as a collision with an object, or detect when the mower has been lifted or tipped over. Detecting these events may be useful in controlling the application of drive and/or cutting power, or providing other control functions.

A typical robotic mower employs one or more sensors that are configured to detect collision, and one or more separate sensors that are configured to detect whether the mower has been lifted or tipped over. Thus, just by virtue of the fact that different sensors perform different functions, such mowers necessarily require multiple sensors. However, as an example, a typical sensor for detecting collision employs a hall-sensor or micro-switch that requires physical motion for activation. Such motion may be provided by enabling some degree of movement between body parts of the robotic mower when a collision is experienced. This movement may lead to a consumer experiencing or feeling body rattling when handling the body of the robotic mower and may lead the consumer to question the quality of the machine. Furthermore, these typical sensors are bipolar devices that either detect an event or not, but cannot provide information regarding magnitude or direction of the forces imparted thereon. Thus, for directional information to be provided, multiple sensors must be employed and must be distributed over different directional locations. For example, to detect motion in three sectors, three separate sensors may be required.

BRIEF SUMMARY OF SOME EXAMPLES

Some example embodiments may therefore provide a robotic device having a movement sensor that is capable of detecting both lift and collision in a single sensor. In this regard, some embodiments may be able to determine both magnitude and direction so that rather than employing multiple sensors, a robotic mower may employ a single sensor to detect motion from multiple sectors. In an example embodiment, an electrical resistance based lift and collision sensor may be provided that enables detection of both lift and collision in a single sensor.

In an example embodiment, a robotic vehicle may be provided. The robotic vehicle may include control circuitry configured to execute stored instructions to direct operation of the robotic vehicle on a defined area, and an electrical resistance sensor in communication with the control circuitry. The electrical resistance sensor may be configured to detect motion indicative of a lift event and a collision event using a single sensor.

In another example embodiment, an electrical resistance sensor may be provided. The electrical resistance sensor may be configured to detect motion indicative of a lift event and a collision event of a robotic vehicle. The robotic vehicle may have control circuitry in communication with the electrical resistance sensor. The control circuitry may be configured to execute stored instructions to direct operation of the robotic vehicle on a defined area. The electrical resistance sensor may include a housing, a chock damper, and a force directioner extending substantially coaxially with the chock damper, the force directioner being floated within the housing of the electrical resistance sensor via biasing elements.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
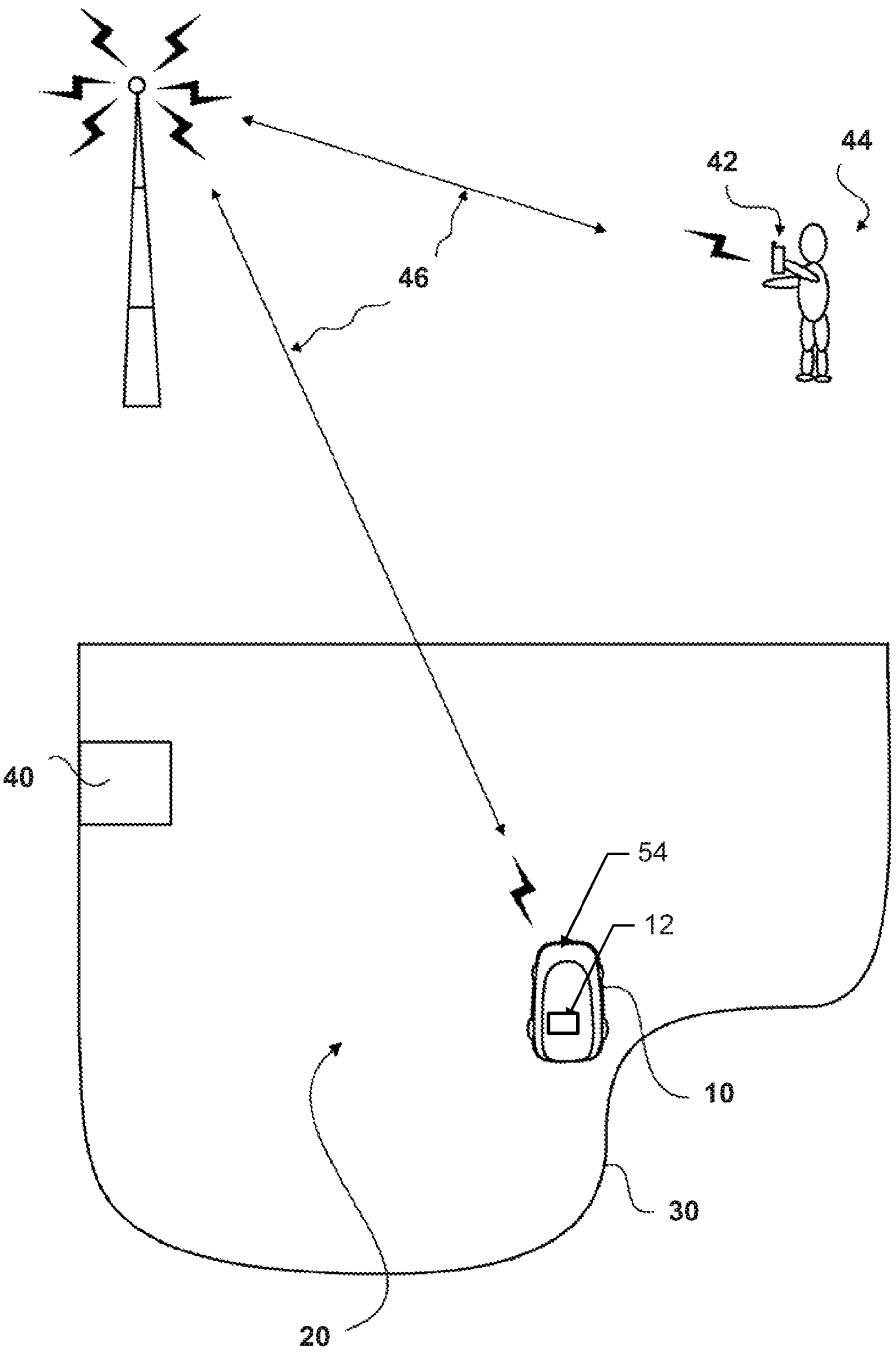
FIG. 1 illustrates an example operating environment for a robotic mower.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure.

Rather, these example embodiments are provided so that this disclosure will satisfy applicable legal requirements. Like reference numerals refer to like elements throughout. Furthermore, as used herein, the term “or” is to be interpreted as a logical operator that results in true whenever one or more of its operands are true. As used herein, operable coupling should be understood to relate to direct or indirect connection that, in either case, enables functional interconnection of components that are operably coupled to each other.

Robotic vehicles such as robotic mowers, robotic watering devices, and/or the like, typically operate in an area that is defined by some technical implementation by which to define boundaries such as, for example, a guide wire that bounds the area to be mowed. The robotic vehicle then roams within the bounded area to ensure that the entire area is mowed, watered, etc., but the robotic vehicle does not go outside of the bounded area. FIG. 1 illustrates an example operating environment for a robotic mower 10 that may employ a system bounded by such a guide wire. However, it should be appreciated that the robotic mower 10 is merely an example of a robotic vehicle that may employ an example embodiment. The robotic mower 10 may operate to cut grass on a parcel 20 (i.e., a land lot), the boundaries of which may be defined using one or more physical boundaries (e.g., a fence, wall, curb and/or the like), a guide wire 30 or combinations thereof. The guide wire 30 may emit electrical signals that are detectable by the robotic mower 10 to inform the robotic mower 10 when a boundary of the parcel 20 has been reached. The robotic mower 10 may be controlled, at least in part, via control circuitry 12 located onboard. The control circuitry 12 may include, among other things, the ability to detect the guide wire 30 to redirect the robotic mower 10 to other areas within the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry in a manner that enables the robotic mower 10 to systematically traverse the parcel 20 while operating a cutting blade to cut the grass on the work area of the parcel 20.

In some embodiments, the control circuitry 12 of the robotic mower 10 may be configured to communicate with an electronic device 42 (e.g., a computer, mobile telephone, PDA, smart phone, and/or the like) of a remote operator 44 via a wireless communication network 46. However, the wireless network 46 and other remote devices may not be employed in some embodiments, as described below. If employed, the wireless network 46 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. In some cases, the wireless network 46 may be a peer-to-peer (P2P) network or a proprietary network. Communication between the wireless network 46 and the devices or databases (e.g., servers, electronic device 42, control circuitry 12) may be accomplished by either wireline or wireless communication mechanisms and corresponding protocols.

Figure 2B:
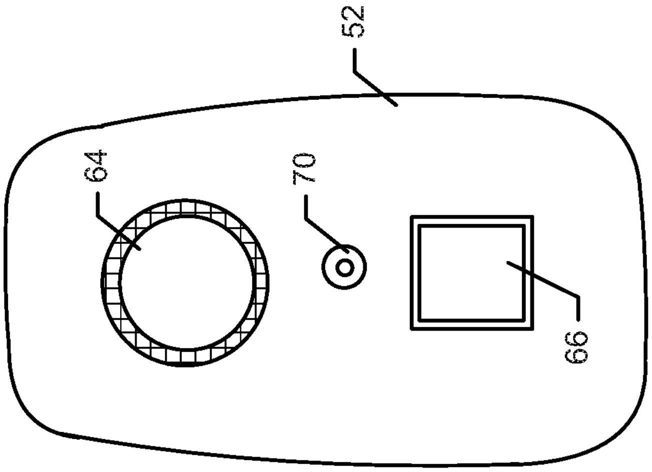
FIG. 2B illustrates a schematic view of an inner housing and various other components of the robotic mower according to an example embodiment.
Figure 2A:
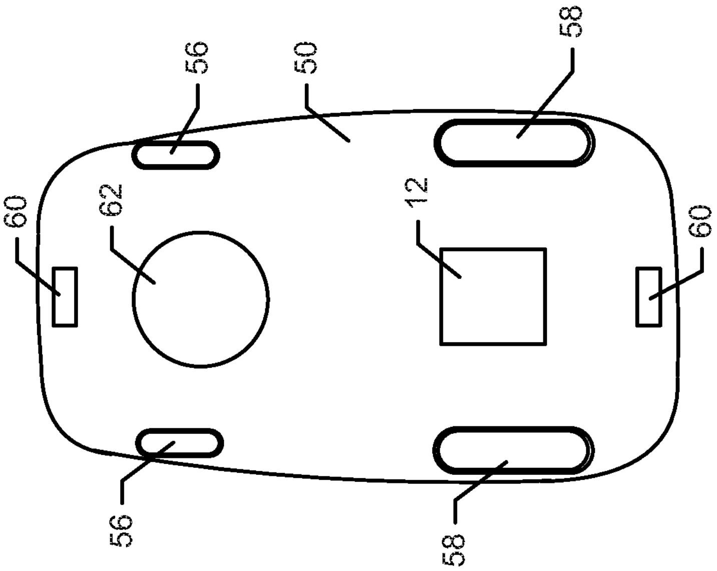
FIG. 2A illustrates a schematic view of a base plate and various components of the robotic mower according to an example embodiment.

FIG. 2, which includes FIGS. 2A and 2B, illustrates some of the parts that may be employed in connection with an example of the robotic mower 10. However, it should be appreciated that example embodiments may be employed on numerous other vehicles that may employ different designs. FIG. 2A illustrates a schematic view of a base plate and various components of the robotic mower according to an example embodiment and FIG. 2B illustrates a schematic view of an inner housing and various other components of the robotic mower according to an example embodiment. It should be appreciated that the robotic mower 10 may take different forms or shapes, and may include different components in some embodiments.

Referring to FIGS. 1 and 2, the robotic mower 10 may include a base plate 50, an inner housing 52 and an outer housing 54. The inner housing 52 may be configured to be arranged on top of the base plate 50 and the outer housing 54 may be configured to be arranged on top of the inner housing 52. The base plate 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction, but may otherwise not be steerable. However, the one or more front wheels 56 may be steerable responsive to control by the control circuitry 12. In some alternative embodiments, the rear wheels 58 may also be enabled to contribute to steering.

In an example embodiment, the base plate 50 may further include one or more sensors 60 that may be used to detect the guide wire 20 and/or objects that may form part of the boundary of the parcel. The sensors 60 may also detect objects that may be encountered during operation of the robotic mower 10 within the boundaries of the parcel 20. These objects may be fixed or temporary (e.g., movable) objects. In some cases, the sensors 60 may include a front sensor and a rear sensor. However, it should be appreciated that any number of sensors may be employed and they may be disposed at any desirable location on the robotic mower 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic mower 10 relative to boundaries or other points of interest (e.g., a starting point, the guide wire or other key features) of the parcel 20, or determining a position history or track of the robotic mower 10 over time.

The base plate 50 may further support a cutting engine 62 configured to drive a cutting blade or other cutters of the robotic mower 10. In some embodiments, the outer housing 54 and the inner housing 52 may be plastic, light metal, or other similarly lightweight components. The inner housing 52 may include a cover 64 for the cutting engine 62. In an example embodiment, a user interface 66 may be provided to mate with either or both of the inner housing 52 and the outer housing 54. The user interface 66 may be employed to interface with the control circuitry 12 for controlling operations of the robotic mower 10.

Figure 4:
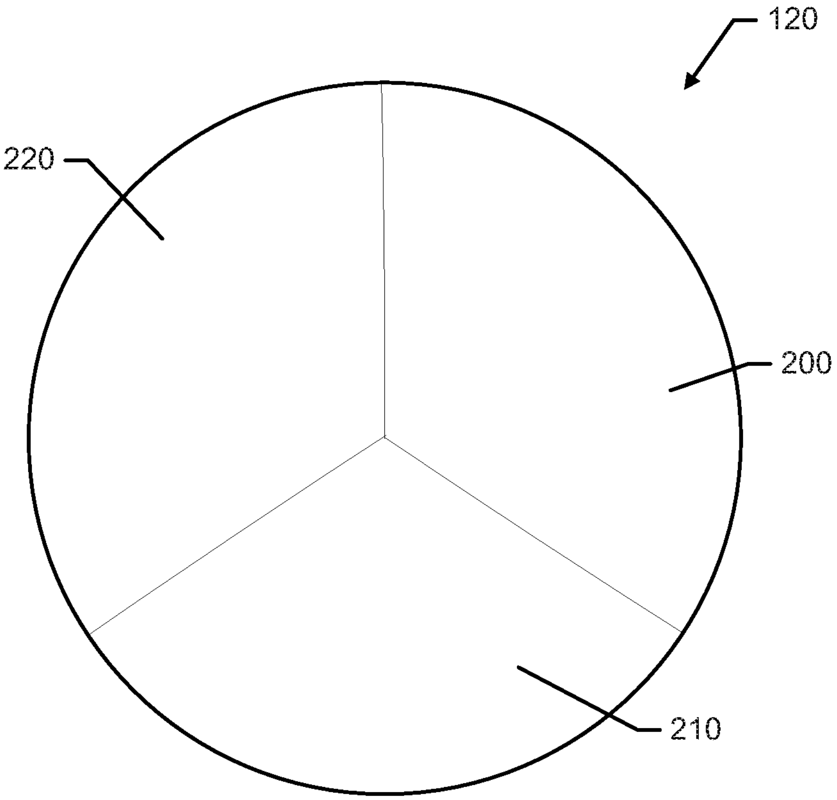
FIG. 4 illustrates a sector diagram of the directional sensing capabilities of an example embodiment.

In some embodiments, the robotic mower 10 may further include an electrical resistance sensor 70 for detecting lifting (or tipping beyond a threshold amount) and/or collision of the robotic mower 10. The electrical resistance sensor 70 may be capable of communicating with the control circuitry 12 to inform the control circuitry 12 when an event is detected that would be indicative of or otherwise relate to a collision or lifting of the robotic mower 10. The electrical resistance sensor 70 may be configured to detect forces imparted thereon (and therefore also imparted on the robotic mower 10) with very little physical motion required. Moreover, the electrical resistance sensor 70 may be configured to detect the direction of forces that are sensed by the electrical resistance sensor 70. Thus, for example, the electrical resistance sensor 70 may be able to differentiate between directions from which forces are received. The ability to detect directional information about movement experienced by the electrical resistance sensor 70 may enable the electrical resistance sensor 70 to detect both lift and collision within a single sensor. Moreover, in one example embodiment, information regarding the sector from which a particular force is experienced (e.g., as shown in FIG. 4) may also be provided.

Figure 3:
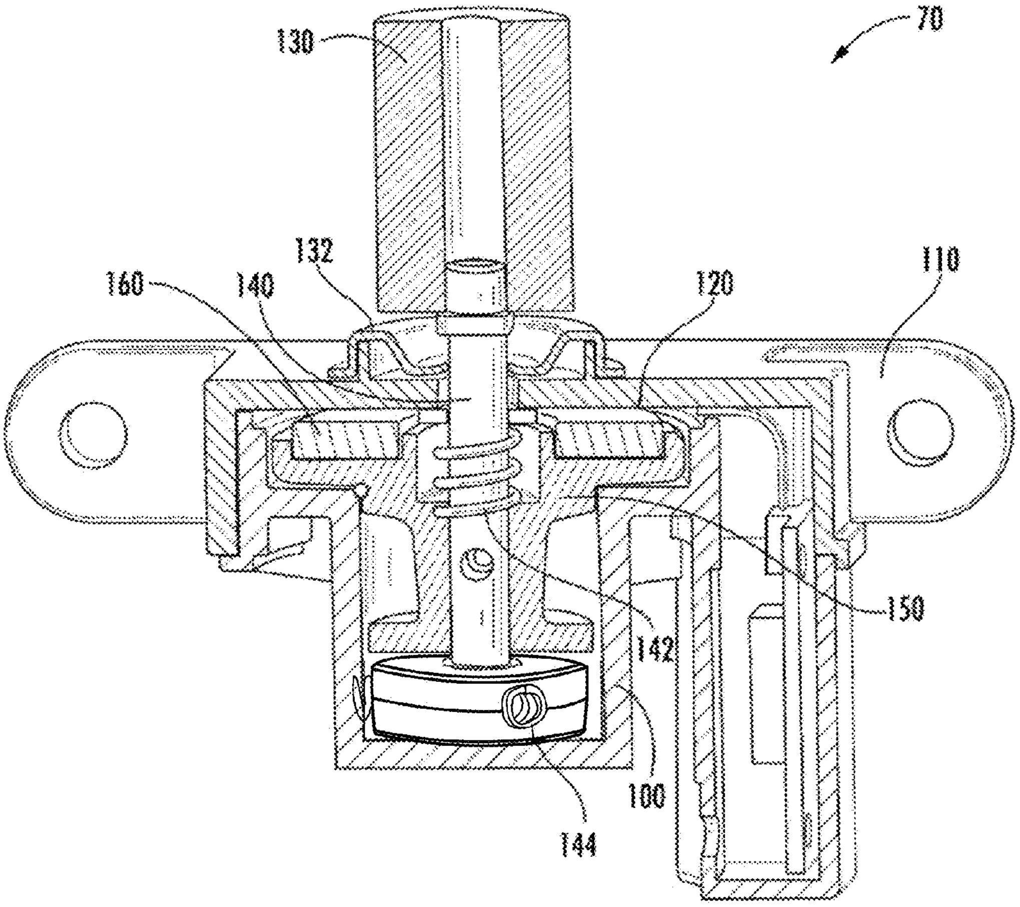
FIG. 3 illustrates a diagram of various components of a sensor employing electrical resistance to detect forces according to an example embodiment.

FIG. 3 illustrates a diagram of various components of a sensor employing electrical resistance to detect forces according to an example embodiment. The electrical resistance sensor 70 of FIG. 3 may include a housing 100 that may be mounted to a structure (e.g., the base plate 50, inner housing 52, or any other suitable structure) of the robotic mower 10 via a mounting bracket 110 that may be screwed or bolted to the structure. However, it should be appreciated that some embodiments may not employ screws or bolts, but may instead employ other method of adhesion such as welding, gluing and/or the like.

Within the housing 100, a resistance element 120 may be provided. The resistance element 120 may be divided into three sectors (see FIG. 4) so that forces detected may be distinguished relative to which of the three sectors they are associated. In an example embodiment, a chock damper 130 may be provided to communicate externally applied forces to the electrical resistance sensor 70. In this regard, for example, the chock damper 130 may be operably connected to the outer housing 54. Thus, if the outer housing 54 experiences an externally applied force (e.g., due to lifting or collision), the chock damper 130 may receive a component of that applied force. Since the housing 100 is mounted to another structure (e.g., the base plate 50 or the inner housing 52), a small amount of relative motion may be induced and communicated via the chock damper 130 to a force directioner 140. In an example embodiment, a flexible coupling 132 (e.g., a flex-gasket) may be provided at an interface between the chock damper 130 and the housing 100 in order to prevent the entry of debris into the housing 100 or between the components of the electrical resistance sensor 70.

The force directioner 140 may, in some cases, be provided in the form of a rod, shaft, or joystick-like component that is enabled to move in vertical and horizontal directions responsive to application of a force thereto. In an example embodiment, a distal end of the force directioner 140 may be disposed within a cavity disposed in the chock damper 130 such that the longitudinal axes of the chock damper 130 and the force directioner 140 are aligned. The force directioner 140 may be provided to "float" within the housing 100 so that it is enabled to move directionally responsive to an applied force. For example, when lifted, a vertical force may be experienced as a displacement in the vertical direction and when a collision occurs, a displacement in the horizontal direction may be experienced responsive to the application of the force received to the chock damper 130. Thus, for example, the applied force experienced at the chock damper 130 may be communicated to the force directioner 140 to cause a displacement of the force directioner 140 in a direction that is directly responsive to the force applied.

The force directioner 140 may be "floated" by a series of directionally distinct, spring mounted supports. In this regard, for example, a relief spring 142 may be provided to vertically support the force directioner 140 and a centering spring assembly 144 may be provided to horizontally support the force directioner 140. Although the centering spring assembly 144 is shown at a proximal end of the force directioner 140, it should be appreciated that the centering spring assembly 144 may be disposed anywhere along the length of the force directioner 140 in alternative embodiments. Similarly, although the relief spring 142 is shown disposed at a middle portion of the force directioner 140, alternative embodiments may position the relief spring 142 at other positions along the force directioner 140.

In an example embodiment, the force directioner 140 may be operably coupled to a motion delimiter 150 that is provided to fit within the housing 100. The motion delimiter 150 may be shaped to receive the force directioner 140 and move responsive to movement of the force directioner 140 when a force is applied to the force directioner 140. However, the motion delimiter 150 may be sized such that only a limited amount of motion of the force directioner 140 is possible due to the tolerances provided between the motion delimiter 150 and the interior of the housing 100. In an example embodiment, a pressure equalizer 160 may be mounted on the motion delimiter 150. The pressure equalizer 160 may be positioned proximate to, but spaced apart from the resistance element 120 when the force directioner 140 is in its rest position.

Accordingly, in this example embodiment, the relief spring 142 is provided to support the force directioner 140 in such a way that the resistance element 120 remains unloaded when no external force or pressure is applied. In this regard, the resistance element 120 is configured to produce an electrical signal when it is loaded or contacted by the pressure equalizer 160. Thus, for example, when no force is applied to the force directioner 140, the pressure equalizer 160 remains spaced apart from the resistance element 120. However, when a force is applied to the force directioner 140 to displace the force directioner 140, the force directioner 140 may transfer motion to the pressure equalizer 160 (e.g., via the motion delimiter 150) and the pressure equalizer 160 may contact the resistance element 120. The resistance element 120 may then generate an electrical signal responsive to the contact. This arrangement may prevent long term static errors, and also shield the electrical signal from mechanical noise.

The location of the contact between the resistance element 120 and the pressure equalizer 160 may be identified as being associated with one of the sectors defined in the resistance element 120 (see FIG. 4). The control circuitry 12 of the robotic mower 10 may be configured to process the electrical signal provided from the resistance element 120 to determine which of the three sectors received the contact and therefore also determine the direction of the applied force. In some embodiments, a magnitude of the force may also be estimated since the magnitude of signal generated may be proportional to the contact area of the resistance element 120 and the pressure equalizer 160. By monitoring the electrical signals generated by the resistance element 120 relative to the directional information that is determinable from the three sectors, the processing circuitry 12 may be enabled to determine the difference between a lift and a collision event. Moreover, the direction from which a force is received may also indicate which part of the robotic mower 10 has experienced a collision when a collision event occurs.

The “floating” of the force directioner 140 using both the relief spring 142, which is oriented to support the force directioner 140 vertically, and the centering spring assembly 144, which is oriented to support the force directioner 140 in the horizontal direction, enables the force directioner 140 to impart a force on the resistance element 120 (via the motion delimiter 150 and the pressure equalizer 160) responsive to both lifting and collision in the same sensor. However, this arrangement also enables the designer to arrange the sensitivity of the sensor to lifting and collision events based on the spring forces employed in each respective spring assembly. For example, the designer may be enabled to select a lower force for lift detection and a higher force for collision detection. Thus, not only is the electrical resistance sensor 70 sensitive to both lifting and collision events, but the sensitivity to each respective event may be adjustable.

FIG. 4 illustrates a plan view of the resistance element 120 of an example embodiment. As shown in FIG. 4, the resistance element 120 is divided into a first sector 200, a second sector 210 and a third sector 220. In this example, each sector may correspond to 120 degrees of area around the robotic mower 10 with the first sector 200 covering an area from 0 degrees to about 120 degrees relative to a head of the robotic mower 10, while the second sector 210 covers from about 120 degrees relative to the head to about 240 degrees relative to the head. The third sector 220 therefore covers the remaining section defined between 240 degrees relative to the head back to 0 degrees (or 360 degrees). It should be appreciated that the sectors could be oriented differently in some embodiments relative to the head of the robotic mower 10 or a different number of sectors may be employed.

As indicated above, some embodiments may provide a robotic vehicle (e.g., an autonomously operable or self-guidable robotic mower, watering robot, and/or the like) that employs the electrical resistance sensor 70. The control circuitry 12 of the robotic vehicle (e.g., robotic mower 10) may enable the vehicle to operate autonomously or in a self guided fashion (e.g., without direct and contemporaneous operator interaction) to mow, water, etc., the parcel 20 while also receiving information from the electrical resistance sensor 70 to determine whether a collision or lifting event has occurred based on information provided from only one sensor. Thereafter, the processing circuitry 12 may be configured to implement safety and/or security functions (e.g., stopping the application of drive and/or cutting power) based on the detection of motion by the electrical resistance sensor 70.

In an example embodiment, a robotic vehicle may be provided. The robotic vehicle may include control circuitry configured to execute stored instructions to direct autonomous or self-guided operation of the robotic vehicle on a defined area, and an electrical resistance sensor in communication with the control circuitry. The electrical resistance sensor may be configured to detect motion indicative of a lift event and a collision event using a single sensor.

In some example embodiments, the robotic vehicle may have optional modifications, augmentations or additions provided relative to the features described above. These optional modifications, augmentations or additions may be provided individually or in combination with some, any or all of the other modifications, augmentations or additions described herein and others that may come to mind based on the description provided. For example, in some cases, the electrical resistance sensor may include a resistance element divided into a plurality of sectors in which each sector is capable of detecting an applied force indicative of a direction from which the force was applied based on the sector from which the applied force was detected. In such an example, the electrical resistance sensor may include a force directioner suspended by an assembly of springs that maintain the resistance element unloaded when no force is applied. The force directioner may cause the resistance element to generate an electrical signal in at least one of the sectors responsive to movement of the force directioner in a vertical or horizontal direction. In some cases, the robotic vehicle may further include a base plate supporting a cutting engine and at least one sensor, an inner housing covering the base plate and the cutting engine, and an outer housing covering at least a portion of the inner housing. The electrical resistance sensor may be affixed to the base plate or the inner housing. In some embodiments, the electrical resistance sensor may include a chock damper extending from the electrical resistance sensor to the outer housing to communicate externally supplied forces from the outer housing to the electrical resistance sensor. Alternatively or additionally, the electrical resistance sensor may include a force directioner extending substantially coaxially with the chock damper. The force directioner may be floated within a housing of the electrical resistance sensor via vertically oriented and horizontally oriented biasing elements. In some cases, the force directioner may be vertically supported by a relief spring extending around the force directioner coaxial therewith. In an example embodiment, the chock damper engages the force directioner at a distal end thereof, and the force directioner is floated by a centering spring assembly disposed at a proximal end thereof to support the force directioner horizontally. In some embodiments, the force directioner may be operably coupled to a motion delimiter sized to allow a limited amount of movement within the housing based on tolerances between the motion delimiter and the housing. In an example embodiment, any or all of the modifications above may be included and the electrical resistance sensor may further include a pressure element and a resistance element configured to be spaced apart from each other responsive to no force being applied to the force directioner, and configured to generate an electrical signal responsive to application of force to the force directioner causing contact between the pressure element and the resistance element.

Alternatively or additionally, any or all of the modifications above may be included and the electrical resistance sensor may further include a pressure element disposed at the motion delimiter and a resistance element disposed proximate to the housing of the electrical resistance sensor to be spaced apart from the pressure element when no force is applied to the force directioner. Responsive to application of force to the force directioner causing contact between the pressure element and the resistance element, an electrical signal may be generated. Alternatively or additionally, any or all of the modifications above may be included and the electrical resistance sensor may further include a pressure element and a resistance element configured to be spaced apart from each other responsive to no force being applied to the force directioner. The resistance element may be divided into sectors such that an electrical signal is generated in a corresponding one of the sectors responsive to application of force to the force directioner causing contact between the pressure element and the corresponding one of the sectors of the resistance element.

In another example embodiment, an electrical resistance sensor may be provided. The electrical resistance sensor may be configured to detect motion indicative of a lift event and a collision event of a robotic vehicle. The robotic vehicle may have control circuitry in communication with the electrical resistance sensor. The control circuitry may be configured to execute stored instructions to direct autonomous or self-guided operation of the robotic vehicle on a defined area. The electrical resistance sensor may include a housing, a chock damper, and a force directioner extending substantially coaxially with the chock damper, the force directioner being floated within the housing of the electrical resistance sensor via biasing elements.

In some example embodiments, the electrical resistance sensor may have optional modifications, augmentations or additions provided relative to the features described above. These optional modifications, augmentations or additions may be provided individually or in combination with some, any or all of the other modifications, augmentations or additions described herein and others that may come to mind based on the description provided. For example, in some cases, the electrical resistance sensor may be mounted to a base plate or inner housing of the robotic vehicle. In such a case, the chock damper may extend from the force directioner to an outer housing of the robotic vehicle to communicate externally supplied forces from the outer housing to the electrical resistance sensor. Alternatively or additionally, the electrical resistance sensor may further include a resistance element divided into a plurality of sectors, each sector being capable of detecting an applied force indicative of a direction from which the force was applied based on the sector from which the applied force was detected. In some embodiments, the force directioner may be suspended by an assembly of springs comprising the biasing elements. The assembly of springs may maintain the resistance element unloaded when no force is applied, but may cause the resistance element to generate an electrical signal in at least one of the sectors responsive to movement of the force directioner in a vertical or horizontal direction. In some examples, the force directioner may be vertically supported by a relief spring extending around the force directioner coaxial therewith. In an example embodiment, the chock damper engages the force directioner at a distal end thereof, and the force directioner is floated by a centering spring assembly disposed at a proximal end thereof to support the force directioner horizontally. In some cases, the force directioner may be operably coupled to a motion delimiter sized to allow a limited amount of movement within the housing based on tolerances between the motion delimiter and the housing.

Alternatively or additionally, any or all of the modifications above may be included and the electrical resistance sensor may further include a pressure element disposed at the motion delimiter and a resistance element disposed proximate to the housing of the electrical resistance sensor to be spaced apart from the pressure element when no force is applied to the force directioner. Responsive to application of force to the force directioner causing contact between the pressure element and the resistance element, an electrical signal may be generated. Alternatively or additionally, any or all of the modifications above may be included and the electrical resistance sensor may further include a pressure element and a resistance element configured to be spaced apart from each other responsive to no force being applied to the force directioner. The resistance element may be divided into sectors such that an electrical signal is generated in a corresponding one of the sectors responsive to application of force to the force directioner causing contact between the pressure element and the corresponding one of the sectors of the resistance element.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic vehicle comprising:

control circuitry configured to execute stored instructions to direct operation of the robotic vehicle on a defined area; and an electrical resistance sensor in communication with the control circuitry, wherein the electrical resistance sensor comprises a force directioner suspended by an assembly of springs that maintain a resistance element unloaded when no force is applied, wherein the resistance element generates an electrical signal in response to movement of the force directioner in a vertical direction or a horizontal direction, wherein the electrical resistance sensor is configured to detect motion in the vertical direction indicative of a lift event and motion in the horizontal direction indicative of a collision event, and wherein the electrical resistance sensor is mounted to the robotic vehicle such that the vertical direction is defined by a longitudinal axis of the force directioner and the horizontal direction is defined in a horizontal plane perpendicular to the longitudinal axis.

2. The robotic vehicle of claim 1, wherein the resistance element is divided into a plurality of sectors, each sector being capable of detecting an applied force indicative of a direction from which the force was applied based on the sector(s) from which the applied force was detected.

3. The robotic vehicle of claim 1, further comprising:
a base plate supporting at least one sensor;
an inner housing covering the base plate; and
an outer housing covering at least a portion of the inner housing,
wherein the electrical resistance sensor is affixed to the base plate or the inner housing.

4. The robotic vehicle of claim 3, further comprising a chock damper extending from the electrical resistance sensor to the outer housing to communicate externally supplied forces from the outer housing to the electrical resistance sensor.

5. The robotic vehicle of claim 4, wherein the electrical resistance sensor comprises a force directioner extending substantially coaxially with the chock damper, the force directioner being floated within a housing of the electrical resistance sensor via vertically oriented and horizontally oriented biasing elements.

6. The robotic vehicle of claim 5, wherein the force directioner is vertically supported by a relief spring extending around the force directioner coaxial therewith.

7. The robotic vehicle of claim 6, wherein the chock damper engages the force directioner at a distal end thereof, and wherein the force directioner is floated by a centering spring assembly disposed at a proximal end thereof to support the force directioner horizontally.

8. The robotic vehicle of claim 7, wherein the force directioner is operably coupled to a motion delimiter sized to allow a limited amount of movement within the housing based on tolerances between the motion delimiter and the housing.

9. The robotic vehicle of claim 5, wherein the electrical resistance further comprise a pressure element and a resistance element configured to be spaced apart from each other responsive to no force being applied to the force directioner, and configured to generate an electrical signal responsive to application of force to the force directioner causing contact between the pressure element and the resistance element.

10. The robotic vehicle of claim 8, wherein the electrical resistance sensor further comprises a pressure element disposed at the motion delimiter and a resistance element disposed proximate to the housing of the electrical resistance sensor to be spaced apart from the pressure element when no force is applied to the force directioner, and wherein responsive to application of force to the force directioner causing contact between the pressure element and the resistance element, an electrical signal is generated.

11. The robotic vehicle of claim 5, wherein the electrical resistance sensor further comprises a pressure element and a resistance element configured to be spaced apart from each other responsive to no force being applied to the force directioner, and wherein the resistance element is divided into sectors such that an electrical signal is generated in a corresponding one of the sectors responsive to application of force to the force directioner causing contact between the pressure element and the corresponding one of the sectors of the resistance element.

12. An electrical resistance sensor configured to detect motion indicative of a lift event and a collision event of a robotic vehicle, the robotic vehicle having control circuitry in communication with the electrical resistance sensor, the control circuitry being configured to execute stored instructions to direct operation of the robotic vehicle on a defined area, the electrical resistance sensor comprising:
a housing;
a chock damper; and
a force directioner extending substantially coaxially with the chock damper, the force directioner being floated within the housing of the electrical resistance sensor via biasing elements, the biasing elements being configured to enable deflection of the force directioner in both a vertical direction and a horizontal direction to be detected by the electrical resistance sensor as the motion indicative of the lift event and the collision event, respectively,
wherein electrical resistance sensor is configured to be mounted to the robotic vehicle such that the vertical direction is defined by a longitudinal axis of the force directioner and the horizontal direction is defined in a horizontal plane perpendicular to the longitudinal axis.

13. The electrical resistance sensor of claim 12, wherein the electrical resistance sensor is mounted to a base plate or inner housing of the robotic vehicle, and wherein the chock damper extends from the force directioner to an outer housing of the robotic vehicle to communicate externally supplied forces from the outer housing to the electrical resistance sensor.

14. The electrical resistance sensor of claim 12, further comprising a resistance element divided into a plurality of sectors, each sector being capable of detecting an applied force indicative of a direction from which the force was applied based on the sector from which the applied force was detected.

15. The electrical resistance sensor of claim 14, wherein the force directioner is suspended by an assembly of springs comprising the biasing elements, the assembly of springs maintaining the resistance element unloaded when no force is applied, but causing the resistance element to generate an electrical signal in at least one of the sectors responsive to movement of the force directioner in the vertical or the horizontal direction.

16. The electrical resistance sensor of claim 12, wherein the force directioner is vertically supported by a relief spring extending around the force directioner coaxial therewith.

17. The electrical resistance sensor of claim 16, wherein the chock damper engages the force directioner at a distal end thereof, and wherein the force directioner is floated by a centering spring assembly disposed at a proximal end thereof to support the force directioner horizontally, and wherein the force directioner is operably coupled to a motion delimiter sized to allow a limited amount of movement within the housing based on tolerances between the motion delimiter and the housing.

18. The electrical resistance sensor of claim 16, wherein the electrical resistance sensor further comprises a pressure element and a resistance element configured to be spaced apart from each other responsive to no force being applied to the force directioner, and configured to generate an electrical signal responsive to application of force to the force directioner causing contact between the pressure element and the resistance element, and wherein the resistance element is divided into sectors such that an electrical signal is generated in a corresponding one of the sectors responsive to application of force to the force directioner causing contact between the pressure element and the corresponding one of the sectors of the resistance element.

19. The electrical resistance sensor of claim 17, wherein the electrical resistance sensor further comprises a pressure element disposed at the motion delimiter and a resistance element disposed proximate to the housing of the electrical resistance sensor to be spaced apart from the pressure element when no force is applied to the force directioner, and wherein responsive to application of force to the force directioner causing contact between the pressure element and the resistance element, an electrical signal is generated.

* * * * *